(12) United States Patent
Sato et al.

(10) Patent No.: US 11,619,648 B2
(45) Date of Patent: Apr. 4, 2023

(54) INERTIAL MEASUREMENT DEVICE

(71) Applicant: Seiko Epson Corporation, Toyko (JP)

(72) Inventors: Kenta Sato, Shiojiri (JP); Jun Watanabe, Matsumoto (JP)

(73) Assignee: SEIKO EPSON CORPORATION

( * ) Notice: Subject to any disclaimer, the term of this patent is extended or adjusted under 35 U.S.C. 154(b) by 46 days.

(21) Appl. No.: 17/238,310

(22) Filed: Apr. 23, 2021

(65) Prior Publication Data

US 2021/0333304 A1 Oct. 28, 2021

(30) Foreign Application Priority Data

Apr. 24, 2020 (JP) .............................. JP2020-077201

(51) Int. Cl.
*G01P 15/08* (2006.01)
*G01P 1/02* (2006.01)

(52) U.S. Cl.
CPC ............ *G01P 15/0802* (2013.01); *G01P 1/02* (2013.01); *G01P 1/023* (2013.01)

(58) Field of Classification Search
CPC .. G01P 1/02; G01P 1/023; G01P 1/026; G01P 15/0802; G01P 15/08
See application file for complete search history.

(56) References Cited

U.S. PATENT DOCUMENTS

| | | | |
|---|---|---|---|
| 9,057,738 B1* | 6/2015 | Sterling | G01P 1/023 |
| 2005/0261073 A1* | 11/2005 | Farrington, Jr. | G01P 15/00 473/131 |
| 2014/0045630 A1* | 2/2014 | Perkins | G01P 1/02 473/570 |
| 2015/0362331 A1* | 12/2015 | Sanchez | A63B 53/14 702/153 |
| 2016/0187661 A1* | 6/2016 | Yajima | G02B 27/0172 345/8 |
| 2016/0206215 A1* | 7/2016 | Takahashi | A61B 5/681 |
| 2017/0259114 A1* | 9/2017 | Yamada | A63B 71/0619 |
| 2018/0070154 A1* | 3/2018 | Watanabe | A61B 5/6823 |
| 2019/0368892 A1* | 12/2019 | Cook | G01P 15/14 |
| 2021/0085880 A1* | 3/2021 | Steck | G16H 50/70 |
| 2021/0100460 A1* | 4/2021 | Dagdeviren | G01C 19/00 |

FOREIGN PATENT DOCUMENTS

| | | |
|---|---|---|
| JP | H10-48040 A | 2/1998 |
| JP | H11-163593 A | 6/1999 |
| JP | H11-326033 A | 11/1999 |
| JP | 2007-218731 A | 8/2007 |

* cited by examiner

*Primary Examiner* — Helen C Kwok
(74) *Attorney, Agent, or Firm* — Harness, Dickey & Pierce, P.L.C.

(57) ABSTRACT

An inertial measurement device includes: an inertial sensor; a battery supplying electric power to the inertial sensor; a first case accommodating the inertial sensor; and a second case accommodating the battery. The battery and the first case are spaced apart from each other. The second case is fixed outside the first case.

8 Claims, 9 Drawing Sheets

INERTIAL MEASUREMENT DEVICE

The present application is based on, and claims priority from JP Application Serial Number 2020-077201, filed Apr. 24, 2020, the disclosure of which is hereby incorporated by reference herein in its entirety.

BACKGROUND

1. Technical Field

The present disclosure relates to an inertial measurement device.

2. Related Art

Recently, in order to increase the efficiency of production processes and improve the yield of products, it is increasingly important to monitor the state of a precision device or measure a vibration in an environment where the precision device is installed. Therefore, an inertial measurement device that can easily measure a vibration is desired. For example, JP-A-2007-218731 discloses an impact detection device having a battery for power supply built in an internal space of an outer case. This impact detection device has the battery built in the outer case and therefore needs no electrical cords for power supply. The impact detection device can be installed at any place and can easily measure a vibration.

However, in the impact detection device described in JP-A-2007-218731 as an inertial measurement device, the battery and an impact sensor are arranged at corresponding positions on the opposite sides of a substrate in the internal space of the outer case and therefore heat generated by the battery at the time of charging and discharging propagates to peripheries of the impact sensor via the substrate, causing the impact sensor to suddenly heat up. As the impact sensor heats up, a thermal gradient is generated in the internal space of the outer case, posing a risk of a temperature difference between a temperature sensor and the impact sensor, which may cause an increase in temperature correction error, or a temperature gradient in the impact sensor, which may cause a distortion and a drop in detection capability.

Such an inertial measurement device with a built-in battery has a problem in that a sudden temperature rise in the sensor due to heat generated by the battery reduces the capability of the inertial measurement device.

SUMMARY

An inertial measurement device includes: an inertial sensor; a battery supplying electric power to the inertial sensor; a first case accommodating the inertial sensor; and a second case accommodating the battery. The battery and the first case are spaced apart from each other. The second case is fixed outside the first case.

DESCRIPTION OF EXEMPLARY EMBODIMENTS

Figure 1:
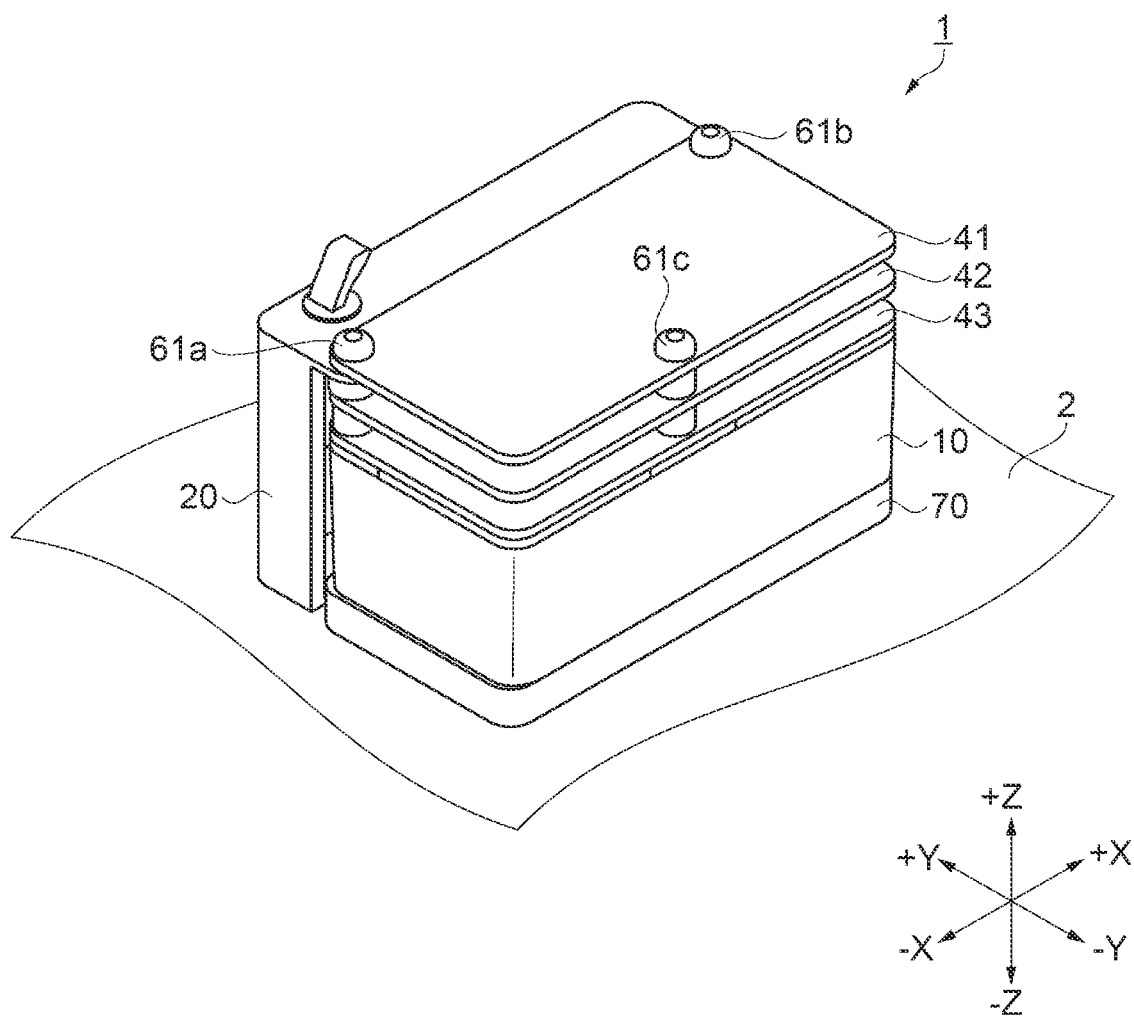
FIG. 1 is a perspective view of an inertial measurement device according to a first embodiment.

Embodiments of the present disclosure will now be described with reference to the drawings. In the drawings, an X-axis, a Y-axis, and a Z-axis which are orthogonal to each other are shown as coordinate axes. In the description below, a direction along the X-axis is referred to as an "X-direction", a direction along the Y-axis is referred to as a "Y-direction", and a direction along the Z-axis is referred to as a "Z-direction". A direction indicated by the head of an arrow is referred to as a positive (+) direction. A direction opposite to the + direction is referred to as a negative (−) direction.

1. First Embodiment

A schematic configuration of an inertial measurement device 1 according to a first embodiment will be described.

Figure 2:
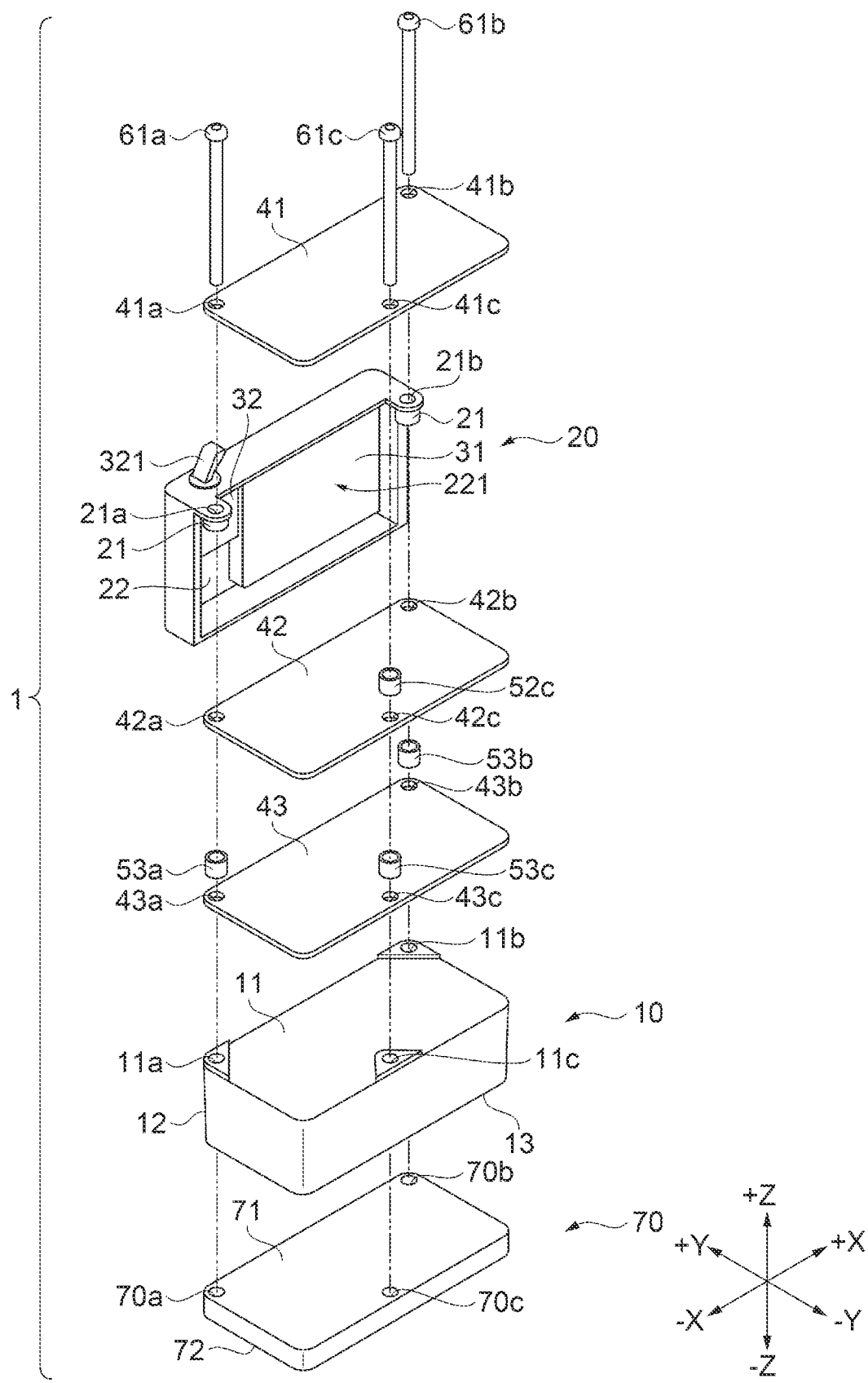
FIG. 2 is an exploded perspective view of the inertial measurement device.

As shown in FIGS. 1 and 2, the inertial measurement device 1 has: a first case 10 accommodating an inertial sensor, not illustrated; a battery 31 supplying electric power to the inertial sensor; a second case 20 accommodating the battery 31; plates 41, 42, 43; screws 61*a*, 61*b*, 61*c* as first fixing components; and a base 70.

The inertial measurement device 1 is installed at an installation surface 2 as a virtual installation surface, for example, using a double-sided adhesive tape or the like, and executes inertial measurement of an acceleration, angular velocity or the like. The installation surface 2 is, for example, a surface of a device such as a manufacturing device or measurement device, or a floor surface where the device is installed, or the like.

In the description below, a direction from the base 70 to the first case 10 of the inertial measurement device 1 is defined as a +Z-direction, and the opposite direction is defined as a −Z-direction. Also, a direction orthogonal to the ±Z-directions and from the screw 61*a* to the screw 61*b* along a lateral surface of the first case 10 is defined as a +X-direction, and the opposite direction is defined as a −X-direction. Moreover, a direction orthogonal to the ±Z-directions and the ±X-directions and from the first case 10 to the second case 20 is defined as a +Y-direction, and the opposite direction is defined as a −Y-direction.

The first case 10 of the inertial measurement device 1 is a casing of a sensor unit having an inertial sensor and is formed of an electrically conductive component such as a metal. The first case 10, which is rectangular as viewed in a plan view from the Z-direction, has an internal accommodation space accommodating a sensor substrate with three inertial sensors mounted thereat.

The inertial sensor is an acceleration sensor. The three inertial sensors detect an acceleration in three axial directions. However, the number of inertial sensors is not limited to three. For example, as one inertial sensor, an acceleration sensor or angular velocity sensor may be provided. Alternatively, as two inertial sensors, an acceleration sensor and an angular velocity sensor may be provided.

Also, in addition to the sensor unit having the inertial sensor, an angular velocity sensor unit detecting an angular velocity in three axial directions can be additionally provided as an extended function in the inertial measurement device 1.

The inertial sensor is not limited to the acceleration sensor or the angular velocity sensor and may be any sensor that can detect information about inertia by a certain detection technique. The inertial sensor may be a physical quantity sensor that can detect a physical quantity equivalent to an acceleration or angular velocity. For example, the inertial sensor may be a physical quantity sensor that can detect a physical quantity such as a velocity or angular acceleration.

The first case 10 has a first surface 11 located in the +Z-direction, a second surface 12 intersecting the first surface 11, and a third surface 13 opposite the first surface and located in the −Z-direction, of surfaces forming a rectangular shape. The first surface 11 and the third surface 13 of the first case 10 are orthogonal to the ±Z-directions and along an XY-plane. Of the four lateral surfaces connected to the first surface 11 and the third surface 13, the lateral surface facing the second case 20 is the second surface 12.

In the first case 10, hole parts 11a, 11b, 11c are provided. The hole part 11a is provided at an end in the −X-direction along the side in the +Y-direction of the first case 10. The hole part 11b is provided at an end in the +X-direction. The hole part 11c is provided at an intermediate position between the hole parts 11a, 11b and along the side in the −Y-direction. The hole parts 11a, 11b, 11c are arranged in a triangle as viewed in a plan view from the Z-direction. The hole parts 11a, 11b, 11c are hole parts penetrated by the screws 61a, 61b, 61c along the ±Z-directions.

In the +Z-direction from the first case 10, the plate 41 as a first plate, the plate 42 as a second plate, and the plate 43 are provided. The plate 43 is provided facing the first surface 11 of the first case 10. The plates are arranged in order of the plate 43, the plate 42, and the plate 41 from the first case 10 side.

The plate 43 has a hole part 43a opened at a position corresponding to the hole part 11a in the first case 10, a hole part 43b opened at a position corresponding to the hole part 11b in the first case 10, and a hole part 43c opened at a position corresponding to the hole part 11c in the first case 10. Similarly, the plate 42 has hole parts 42a, 42b, 42c opened at positions corresponding respectively to the hole parts 11a, 11b, 11c in the first case 10, and the plate 41 has hole parts 41a, 41b, 41c opened at positions corresponding respectively to the hole parts 11a, 11b, 11c in the first case 10. The hole parts 41a, 41b, 41c, 42a, 42b, 42c, 43a, 43b, 43c are hole parts penetrated by the screws 61a, 61b, 61c along the ±Z-directions.

The plates 42, 43 are circuit boards that are rectangular as viewed in a plan view from the Z-direction, for example, printed board or rigid boards where a metal wiring is formed. At the plates 42, 43, extended functional components such as a processing circuit, various switches, a communication circuit, an antenna, a communication interface, a memory, and a charging circuit, not illustrated, are mounted.

At the plate 42, a display unit, not illustrated, is mounted in addition to the extended functional components. For example, when a display unit such as an organic LE panel, liquid crystal panel or light-emitting diode (LED) is mounted at the plate 42, the result of FFT (fast Fourier transform) analysis of a vibration or information about a peak frequency and a peak value of the vibration, based on detection information from the inertial sensor, can be displayed. The plate 42 also functions as a protection plate protecting the extended functional components or the like mounted at the plate 43.

The plate 41 is a light-transmissive protection plate that is rectangular a viewed in a plan view from the Z-direction. For example, the plate 41 can be formed of a resin plate such as an acrylic resin plate. The plate 41 protects the extended functional components and the display unit mounted at the plate 42 and allows the display unit provided at the plate 42 to be visible.

The plate 41 may be formed of other materials than an acrylic resin and may be, for example, an ABS or PET resin plate. The plate 41 may also be formed of other materials than resin. The plate 41 may be formed of a non-light-transmissive material. In such a case, a window part may be provided corresponding to the display unit so that the display unit becomes visible to the user via the window part.

The extended functional components are provided at the plates 42, 43 and are protected by the plate 41. Therefore, the inertial measurement device 1 can independently perform vibration measurement, analysis processing, displaying, communication and the like.

In the inertial measurement device 1, the base 70 is provided at the third surface 13 of the first case 10. The base 70 is a component for installing the inertial measurement device 1 to the installation surface 2 and is provided between the first case 10 and the installation surface 2.

The base 70 has a top surface 71 facing the third surface 13 of the first case 10, and a bonding surface 72 opposite to the third surface 13 side. The bonding surface 72 of the base 70 is in contact with the installation surface 2 as a virtual installation surface.

The base 70 has hole parts 70a, 70b, 70c opened at positions corresponding to and in the −Z-direction from the hole parts 11a, 11b, 11c in the first case 10. The hole parts 70a, 70b, 70c are hole parts penetrated by the screws 61a, 61b 61c along the ±Z-directions.

The bonding surface 72 of the base 70 is a planar mirror surface and can achieve a high measurement accuracy. The base 70 also has a recessed part, not illustrated, at a part of an extending side opposite to the second case 20 side, of the bonding surface 72. When the inertial measurement device 1 is used in the state of being installed to the installation surface 2 with a double-sided adhesive tape, the double-sided adhesive tape can be easily stripped off from such a recessed part.

The second case 20 is fixed outside the first case 10 in the +Y-direction from the first case 10, the plates 41, 42, 43, and the base 70. The second case 20 is a case accommodating the battery 31 and a power supply unit 32 and is formed of a material with a low thermal conductivity such as a plastic.

The second case 20 has two first fixing parts 21 and a battery accommodation part 22. An opening 221 of the battery accommodation part 22 faces the second surface 12 of the first case 10 and is spaced apart from the second surface 12.

Figure 3:
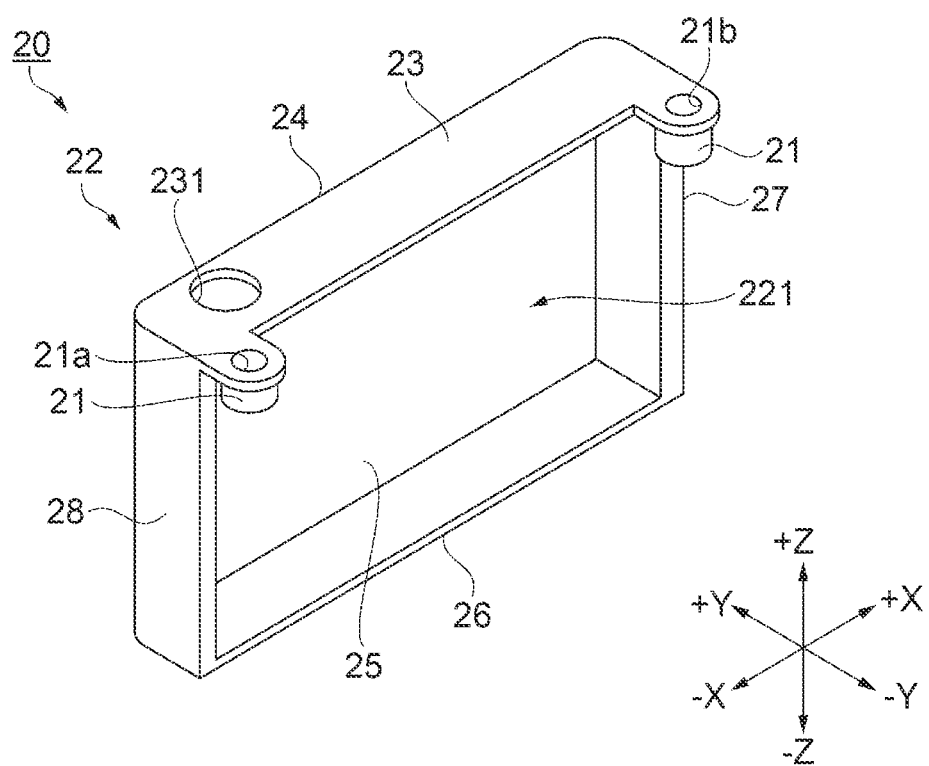
FIG. 3 is a perspective view of a second case.

As shown in FIG. 3, the battery accommodation part 22 has a rectangular recessed shape having the opening 221 at one side of a flat plate shape, and has an inner surface 25, which is the inside of the recessed shape, an outer surface 24 in an inside-outside relationship with the inner surface 25, a top surface 23 in the +Z-direction, a bottom surface 26 as an end surface in the −Z-direction, a lateral surface 27 in the +X-direction, and a lateral surface 28 in the −X-direction. At the top surface 23, a circular hole part 231 is provided near an end in the −X-direction.

The battery accommodation part 22 shown in FIGS. 1 to 6 accommodates the battery 31 and the power supply unit at the inner surface 25, which is the inside of the recessed shape.

Figure 4:
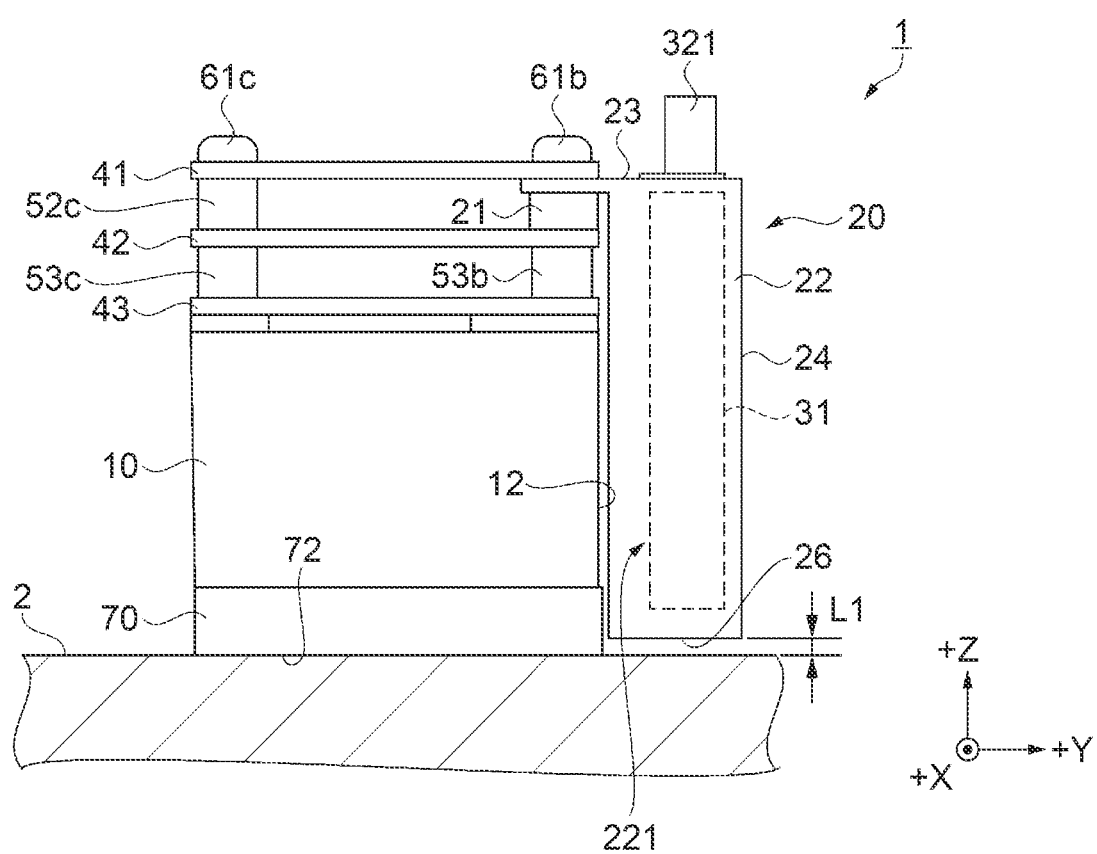
FIG. 4 is a side view of the inertial measurement device.
Figure 5:
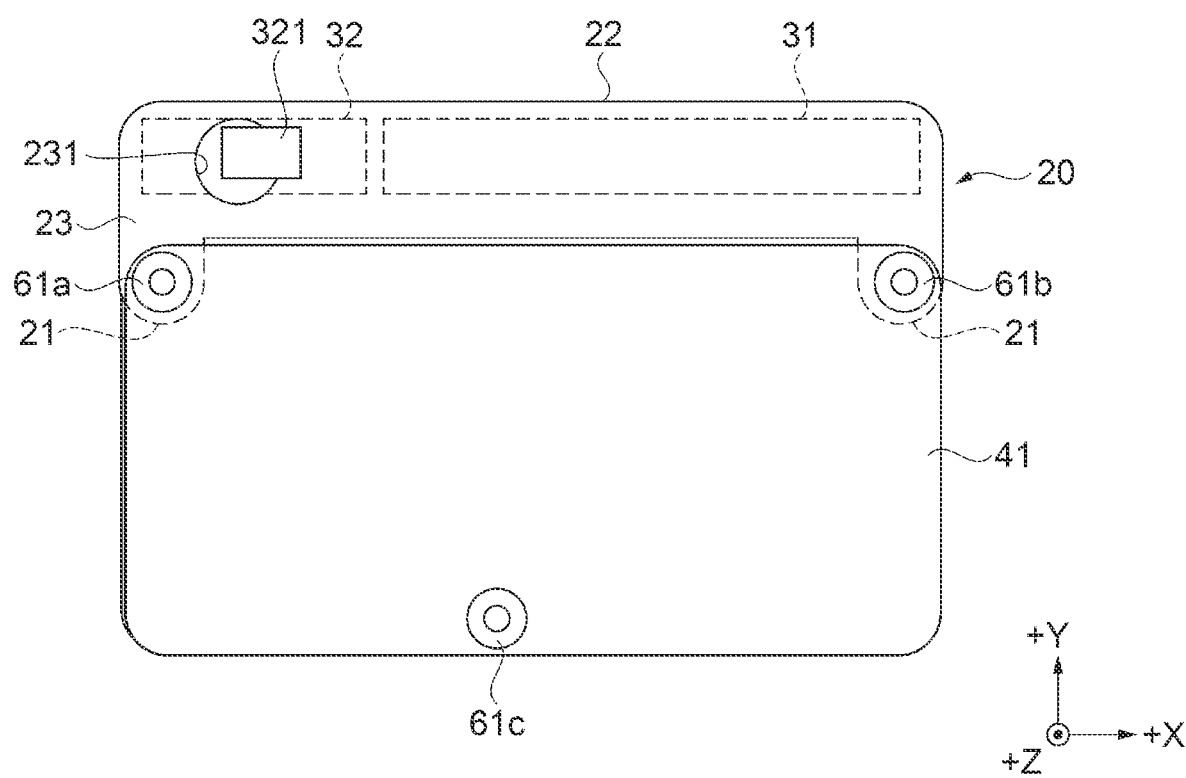
FIG. 5 is a top view of the inertial measurement device.

The battery 31 is provided in contact with the inner surface 25 and the lateral surface 27 of the battery accommodation part 22 and supplies electric power to the inertial sensor via a cable, not illustrated. As shown in FIGS. 4 and 5, the thickness of the battery 31 in the Y-direction is smaller than the thickness of the battery accommodation part 22 in the Y-direction. Therefore, the battery 31 is provided, spaced apart from the first case 10.

Figure 6:
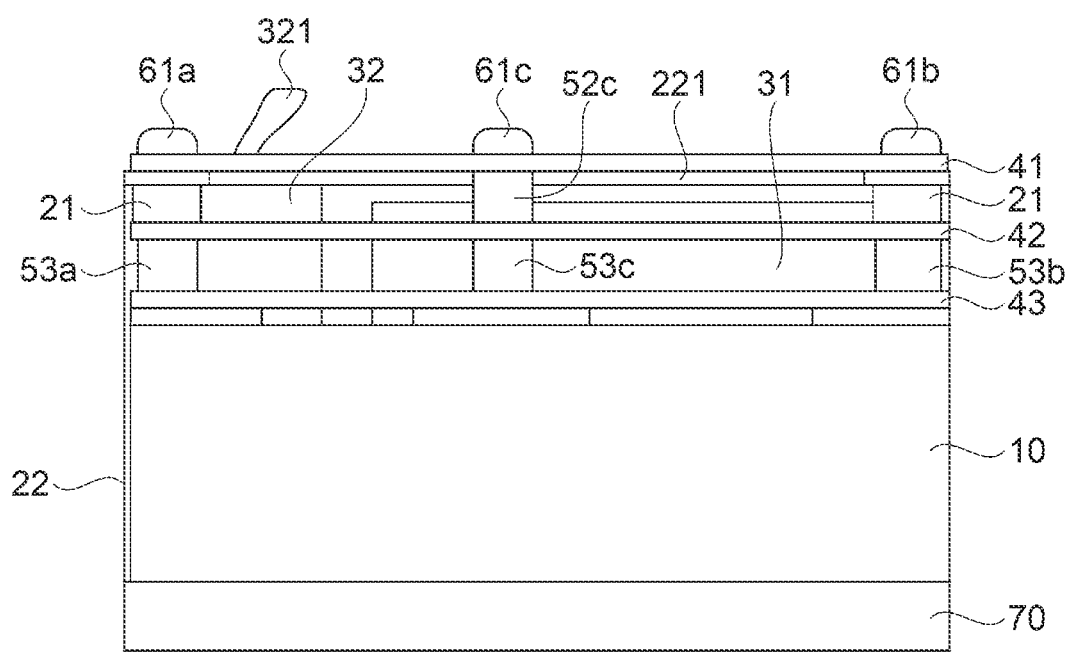
FIG. 6 is a front view of the inertial measurement device.
Figure 6:
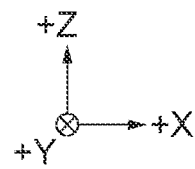

The power supply unit 32 is provided in contact with the inner surface 25 and the lateral surface 28 of the battery accommodation part 22. The power supply unit 32 controls the electric power from the battery 31 via a cable, not illustrated. The power supply unit 32 has a power switch 321 controlling the electric power supplied to the inertial sensor. The power switch 321 can be, for example, a toggle switch or the like and is provided in such a way as to be located at the outside of the battery accommodation part 22 via the hole part 231 provided in the top surface 23 of the second case 20 shown in FIG. 3. As shown in FIGS. 5 and 6, the power switch 321 is provided in such a way as to be located between the two first fixing parts 21, as viewed in a plan view from the opening 221 side of the second case 20.

The two first fixing parts 21 are provided respectively in such a way as to protrude toward the first case 10 from two end parts in a longitudinal direction on the top surface 23 of the battery accommodation part 22. The two first fixing parts 21 are arranged at a side facing the first surface 11 of the first case 10. Since the two first fixing parts 21 are provided respectively in such a way as to protrude toward the first case 10, the second case 20 and the plate 41 overlap each other only at the first fixing parts 21, as viewed in a plan view from the Z-direction in the inertial measurement device 1, as shown in FIG. 5, and therefore do not obstruct the extended functional components mounted at the plate 42.

As shown in FIG. 3, a hole part 21a is provided at the first fixing part 21 provided in the −X-direction in the second case 20, and a hole part 21b is provided at the first fixing part 21 provided in the +X-direction. The hole parts 21a, 21b are opened cylindrically along the Z-direction.

As shown in FIG. 2, in the inertial measurement device 1, the two first fixing parts 21 functioning as spacers are provided between the hole parts 41a, 41b and the hole parts 42a, 42b in order to form a space between the plate 41 and the plate 42. Also, a cylindrical spacer 52c having a hole part is provided between the hole part 41c and the hole part 42c. In other words, the plate 41 and the plate 42 are provided in such a way as to face each other via the spacer 52c and the two first fixing parts 21 and overlap the first surface 11 of the first case 10 as viewed in a plan view from the Z-direction.

Also, cylindrical spacers 53a, 53b, 53c having a hole part are provided between the hole parts 42a, 42b, 42c and the hole parts 43a, 43b, 43c in order to form a space between the plate 42 and the plate 43.

Providing the two first fixing parts 21 and the spacers 52c, 53a, 53b, 53c in this way enables protection of the extended functional components provided at the plate 42 and the plate 43.

The plates, as circuit boards, can be increased or decreased. For example, increasing the plates and the circuits mounted at the plates enables further extension of functions. In such a case, the position where the two first fixing parts 21 functioning as spacers are provided is not limited to between the plate 41 and the plate 42.

The inertial measurement device 1 has the screws 61a, 61b, 61c as the first fixing components. The screws 61a, 61b, 61c penetrate the hole parts 41a, 41b, 41c in the plate 41, the hole parts 42a, 42b, 42c in the plate 42, the hole parts 43a, 43b, 43c in the plate 43, the hole parts in the spacers 52c, 53a, 53b, 53c, the hole parts 21a, 21b in the two first fixing parts 21, and the hole parts 11a, 11b, 11c in the first case 10, and fit in the hole parts 70a, 70b, 70c in the base 70, thus fastening and fixing the components together. Thus, the first case 10, the second case 20, and the plates 41, 42, 43 can be removably fixed to the base 70.

The screws 61a, 61b, 61c are columnar components whose long-side direction is the +Z-direction. The screws 61a, 61b, 61c are male screws having threads on the outside. The hole parts 70a, 70b, 70c in the base 70 have threads on the inside and therefore function as female screws. Thus, the distal ends of the screws 61a, 61b, 61c can be engaged in the hole parts 70a, 70b, 70c in the base 70, enabling the fixing to the base 70.

While the three screws 61a, 61b, 61c are provided in this embodiment, this is not limiting. The number of screws may be two or fewer or may be four or more. The number of screws can be increased or decreased according to the configuration of the inertial measurement device 1.

The fixing with the screws 61a, 61b will now be described, using the screw 61a as an example.

The screw 61a penetrates, from the +Z-direction, the hole part 41a in the plate 41, the hole part 21a in the first fixing part 21, the hole part 42a in the plate 42, the hole part in the spacer 53a, the hole part 43a in the plate 43, and the hole part 11a in the first case 10 in this order, and is fixed in the hole part 70a in the base 70.

As for the fixing with the screw 61c, the screw 61c penetrates, from the +Z-direction, the hole part 41c in the plate 41, the hole part in the spacer 52c, the hole part 42c in the plate 42, the hole part in the spacer 53c, the hole part 43c in the plate 43, and the hole part 11c in the first case 10 in this order, and is fixed in the hole part 70c in the base 70.

As shown in FIG. 4, since the two first fixing parts 21 are provided as spacers between the plates 41, 42, the bottom surface 26 of the second case 20 facing the installation surface 2 is provided in such a way that a distance L1 between the bottom surface 26 and the installation surface 2 is longer than the distance between the bonding surface 72 and the installation surface 2.

As described above, in the inertial measurement device 1 shown in FIGS. 1 to 6 according to this embodiment, the battery 31 is provided in contact with the inner surface of the second case 20. Therefore, even when the temperature of the battery 31 rises at the time of charging and discharging, the resulting heat can be transferred to the outer surface 24 and dissipated.

As shown in FIGS. 4 and 5, the second case 20 is fixed outside the first case 10, with the opening 221 spaced apart from the second surface 12 of the first case 10. Therefore, the battery 31 and the first case 10 are fixed, spaced apart from each other. A space is formed between the battery 31 and the first case 10, achieving a heat insulation effect.

Thus, in the inertial measurement device 1 with the built-in battery, even when the temperature of the battery 31 rises at the time of charging and discharging, the heat is less likely to be transferred to the inertial sensor and a drop in the accuracy of the inertial sensor can be restrained. Also, since there is little change in the temperature of the inertial sensor at the time of charging and discharging, the inertial measurement device 1 can be used during charging or immediately after charging.

In the inertial measurement device 1, the distance L1 between the bottom surface 26 of the second case 20 and the installation surface 2 is longer than the distance between the bonding surface 72 and the installation surface 2. Therefore, the second case 20 does not come into contact with the installation surface 2. Thus, a vibration noise or the like via the second case 20 can be restrained and a drop in the accuracy of the inertial sensor can be restrained.

In the inertial measurement device 1, the power switch 321 controlling the electric power supplied to the inertial sensor from the battery 31 is accommodated in the second case 20. Therefore, a noise generated between the battery 31 and the power switch 321 can be restrained. Thus, a drop in the accuracy of the inertial sensor due to a noise or the like can be restrained.

The power switch 321 in the inertial measurement device 1 is provided in such a way as to be located between the two first fixing parts 21 via the hole part 231. Therefore, the fixing strength of the power switch 321 is stabilized. Thus, durability against a stress applied when the power switch 321 is operated is increased, and the second case 20 can be restrained from being damaged.

The two first fixing parts 21 in the inertial measurement device 1 function as spacers forming a space between the plate 41 and the plate 42, in addition to having the function of fixing the second case 20 outside the first case 10. Therefore, the number of components forming the inertial measurement device 1 can be reduced and the inertial measurement device 1 can be miniaturized. Thus, the range of options for installation places can be extended.

In the inertial measurement device 1, the screws 61*a*, 61*b*, 61*c* as a plurality of first fixing components can fasten and fix together the first case 10, the second case 20, the plates 41, 42, 43, and the base 70. Therefore, the number of components forming the inertial measurement device 1 can be reduced and the inertial measurement device 1 can be miniaturized. Thus, the range of options for installation places can be extended.

2. Second Embodiment

A schematic configuration of an inertial measurement device 1A according to a second embodiment will now be described. The same components as in the inertial measurement device 1 according to the first embodiment are denoted by the same reference signs and similar matters are not described further.

Figure 7:
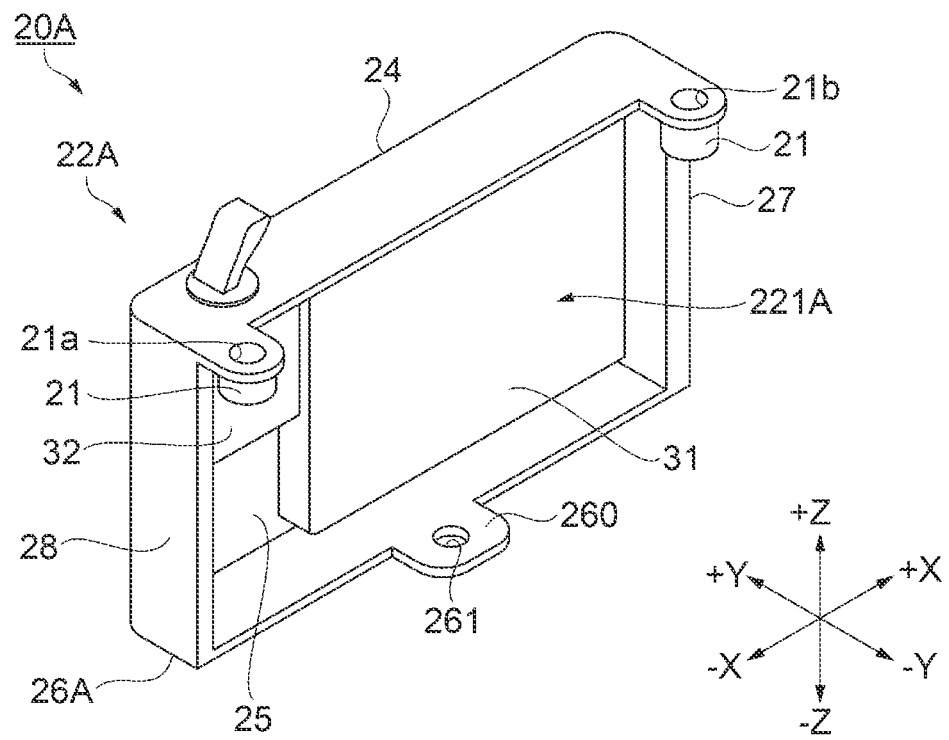
FIG. 7 is a perspective view of a second case according to a second embodiment.
Figure 8:
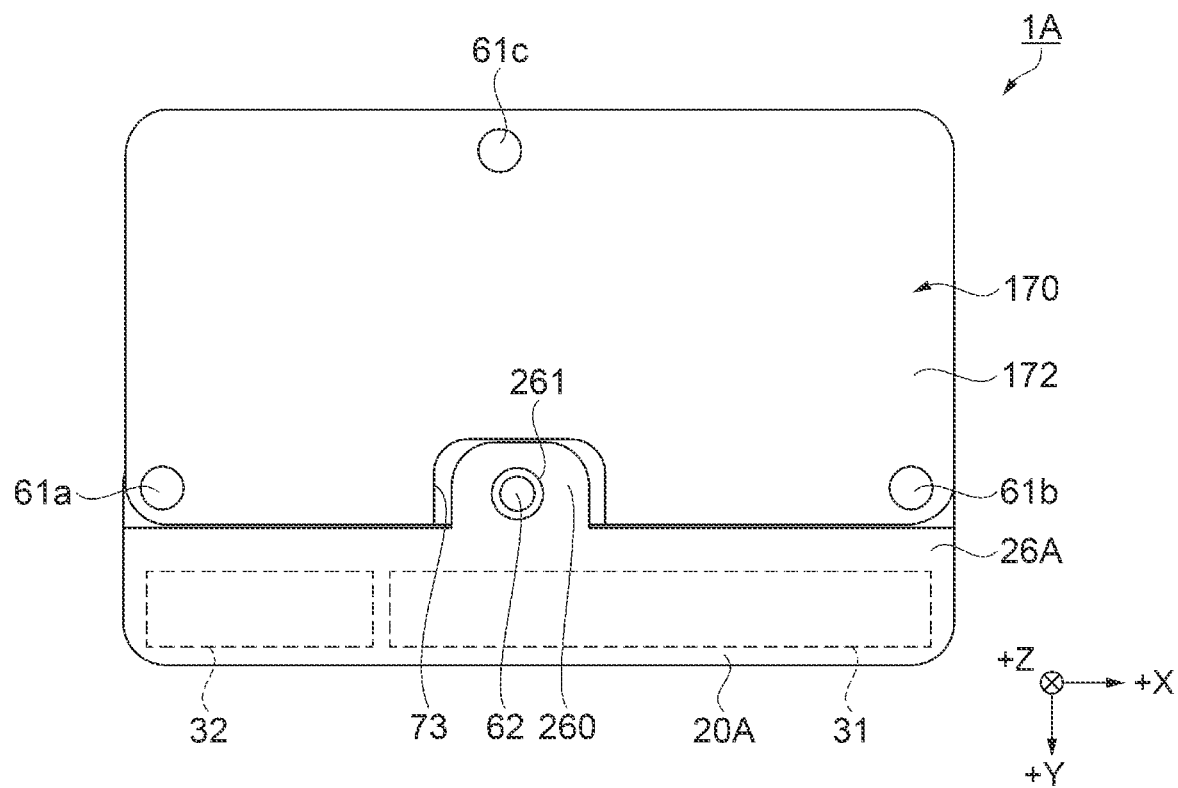
FIG. 8 is a bottom view of an inertial measurement device according to the second embodiment.
Figure 9:
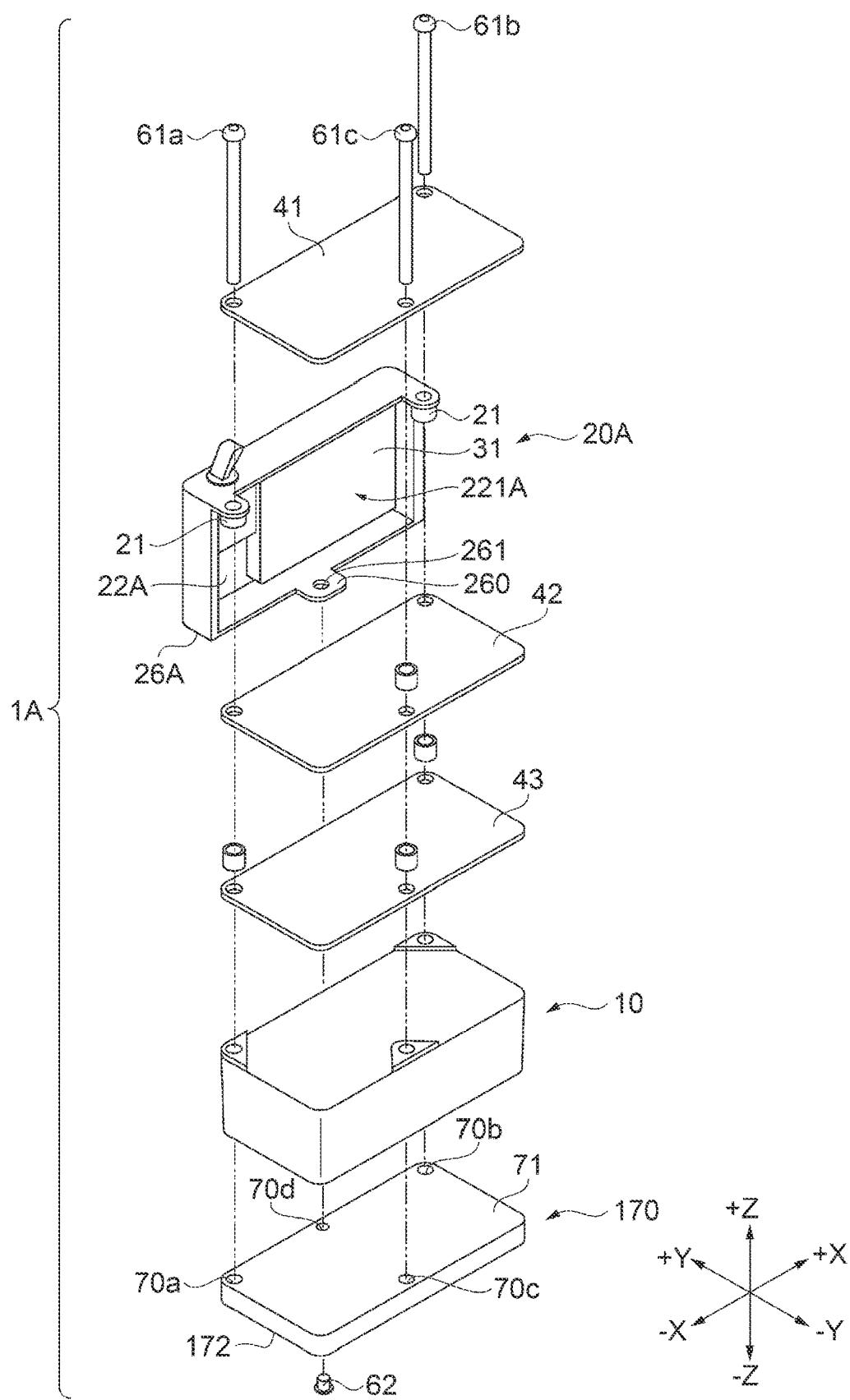
FIG. 9 is an exploded perspective view of the inertial measurement device according to the second embodiment.

As shown in FIGS. 7 to 9, the inertial measurement device 1A has a second case 20A instead of the second case 20, and a base 170 instead of the base 70.

The second case 20A is a case accommodating the battery 31 and the power supply unit 32 and has the two first fixing parts 21 and a battery accommodation part 22A having an opening 221A. The opening 221A in the battery accommodation part 22A faces the second surface 12 of the first case 10 and is spaced apart from the second surface 12.

The battery accommodation part 22A has a rectangular recessed shape having the opening 221A and has the inner surface 25, which is the inside of the recessed shape, the outer surface 24 in an inside-outside relationship with the inner surface 25, the top surface 23 in the +Z-direction, a bottom surface 26A as an end surface in the −Z-direction, the lateral surface 27 in the +X-direction, and the lateral surface 28 in the −X-direction.

As shown in FIG. 7, the bottom surface 26A of the battery accommodation part 22A has a plate-like second fixing part 260 formed of a part in the middle of an end side part in the −Y-direction of the bottom surface 26A that extends in the −Y-direction. A hole 261 is provided in the middle of the second fixing part 260.

As shown in FIG. 8, in the base 170, a cut-out part 73 is provided in the middle on the second surface 12 side of a bonding surface 172. The thickness between the cut-out part 73 and the top surface 71 is smaller than the thickness between the bonding surface 172 and the top surface 71. In the middle of the cut-out part 73, a hole part 70*d* penetrating the base 170 to the top surface 71 is provided.

As shown in FIG. 9, in the inertial measurement device 1A, when the screws 61*a*, 61*b*, 61*c* as a plurality of first fixing components fasten and fix together the first case 10, the second case 20A, the plates 41, 42, 43, and the base 170, as in the inertial measurement device 1, the second fixing part 260 engages with the cut-out part 73 provided at the bonding surface 172 of the base 170. In the inertial measurement device 1A, a screw 62 as a second fixing component penetrates the hole part 70*d* and the hole 261 from the −Z-direction and is fixed therein in the state where the second fixing part 260 and the cut-out part 73 are engaged with each other.

In the inertial measurement device 1A, since the cut-out part 73 has a small thickness, the second case 20A is provided having the bottom surface 26A not in contact with the installation surface 2. The second fixing part 260 is fixed in the cut-out part 73 with the screw 62. Therefore, the second case 20A is fixed at three points, that is, the two first fixing parts 21 and the second fixing part 260.

Thus, in the inertial measurement device 1A, the vibration of the second case 20A can be restrained better.

3. Third Embodiment

The foregoing inertial measurement devices 1, 1A are described as having one of the second cases 20, 20A. However, the second case is not limited to this example and can take other forms. An inertial measurement device 1B according to a third embodiment has a second case 20B instead of the second cases 20, 20A according to the foregoing embodiments.

In the description of the second case 20B, the same components as in the second case 20 are denoted by the same reference signs and similar matters are not described further.

Figure 10:
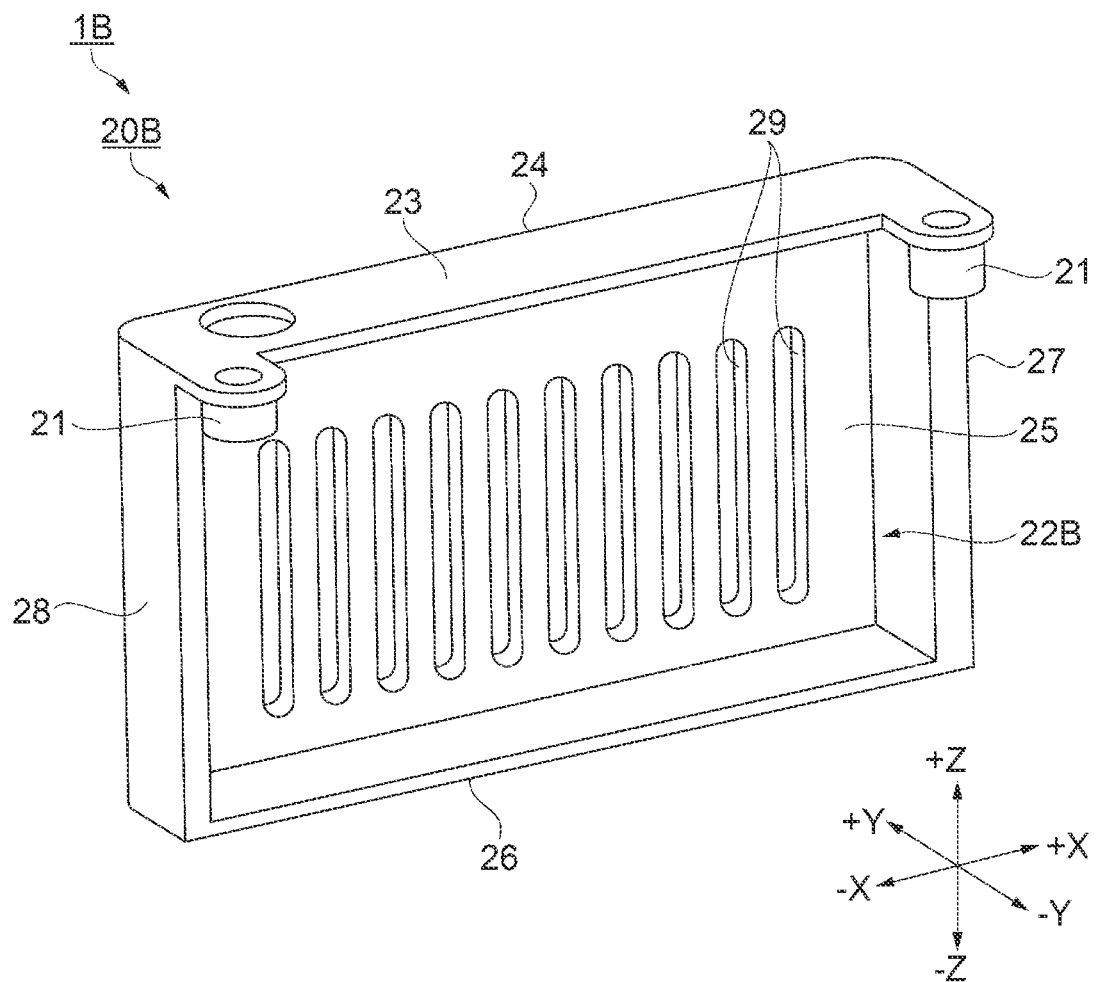
FIG. 10 is a perspective view of a second case according to a third embodiment.

As shown in FIG. 10, the second case 20B has a slit 29 formed at the inner surface 25 facing the battery 31, the slit 29 communicating to the outer surface 24. As the elliptic slit 29 extending along the ±Z-directions is formed in the second case 20B, the heat generated from the battery 31 can be dissipated from the inner surface 25 side to the outer surface 24 side.

Improving the heat dissipation effect in this way makes the temperature inside the second case 20B less likely to rise even at the time of charging and discharging of the battery 31. Therefore, the heat is less likely to be transferred to the inertial sensor and a drop in the accuracy of the inertial sensor can be restrained.

Also, a metal fin may be provided over a range from the inner surface 25 in contact with the battery 31 to the outer surface 24. Providing the metal fin, too, can improve the effect of dissipating the heat generated from the battery 31 and can restrain a drop in the accuracy of the inertial sensor.

The size, shape, and number of the slits 29 and the metal fins are not limited to this embodiment. The slit 29 or the metal fin may also be provided at one of the inner surface 25, the top surface 23, the lateral surfaces 27, 28, and the bottom surface 26, 26A, or all of these surfaces. These elements can be suitably combined together.

What is claimed is:

1. An inertial measurement device comprising:
an inertial sensor;
a battery supplying electric power to the inertial sensor;
a first case accommodating the inertial sensor; and
a second case accommodating the battery, wherein
the battery and the first case are spaced apart from each other, and the second case is fixed outside the first case,
the first case has first surface and a second surface intersecting the first surface,
the second case has a plurality of first fixing parts and a battery accommodation part in a recessed shape having an opening,
the battery accommodation part accommodates battery inside the recessed shape,
the opening faces the second surface and is paced apart from the second surface, and
the plurality of first fixing parts are arranged at a side facing first surface of the first case.

2. The inertial measurement device according to claim 1, wherein
the second case has a slit formed at a surface facing the battery accommodated therein.

3. The inertial measurement device according to claim 1, further comprising
a base provided at a third surface opposite the first surface of the first case, wherein
the base has a bonding surface in contact with a virtual installation surface, the bonding surface opposite to the third surface, and
an end surface of the second case facing the virtual installation surface is provided in such a way that a distance between the end surface and the virtual installation surface is longer than a distance between the bonding surface and the virtual installation surface.

4. The inertial measurement device according to claim 1, further comprising
a power switch, wherein
the second case accommodates the power switch, and
the power switch controls electric power supplied to the inertial sensor.

5. The inertial measurement device according to claim 4, wherein
the power switch is located between the plurality of first fixing parts, as viewed in a plan view from the opening in the second case.

6. The inertial measurement device according to claim 3, further comprising
a first plate, a second plate, and a spacer, wherein
the first plate and the second plate are provided in such a way as to face each other via the spacer and the plurality of first fixing parts and to overlap the first surface of the first case.

7. The inertial measurement device according to claim 6, further comprising
a plurality of first fixing components, wherein
the first plate, the second plate, the spacer, the plurality of first fixing parts, the first case, and the base are provided with a hole part penetrated by the first fixing components, and
the first fixing components penetrate the hole part in one of the first plate, the spacer, and the first fixing parts, and in the second plate and the first case, and is fixed in the hole part in the base.

8. The inertial measurement device according to claim 6, further comprising
a second fixing component, and a second fixing part provided in the second case, wherein
the second fixing part is fixed in a cut-out part provided at the bonding surface of the base, by the second fixing component.

* * * * *